United States Patent [19]

Anthony

[11] 4,058,436
[45] Nov. 15, 1977

[54] NUCLEAR REACTOR SEISMIC FUEL ASSEMBLY GRID

[75] Inventor: Andrew J. Anthony, Tariffville, Conn.

[73] Assignee: Combustion Engineering Inc., Windsor, Conn.

[21] Appl. No.: 638,100

[22] Filed: Dec. 5, 1975

[51] Int. Cl.$^2$ .............................................. G21C 3/30
[52] U.S. Cl. ........................................ 176/78; 176/76
[58] Field of Search ...................... 176/76, 78, 87, 73, 176/75

[56] References Cited

U.S. PATENT DOCUMENTS

| | | | |
|---|---|---|---|
| 3,442,763 | 5/1969 | Chetter | 176/78 |
| 3,607,640 | 9/1971 | Krawiec | 176/78 |
| 3,664,924 | 5/1972 | Krawiec | 176/78 |
| 3,674,637 | 7/1972 | Delafosse | 176/78 |
| 3,679,547 | 7/1972 | Warberg | 176/78 |
| 3,715,275 | 2/1973 | Krawiec | 176/76 |
| 3,753,855 | 8/1973 | Donck | 176/78 |
| 3,920,515 | 11/1975 | Ferrari | 176/78 |

*Primary Examiner*—Stephen C. Bentley
*Assistant Examiner*—Donald P. Walsh

[57] ABSTRACT

The strength of a nuclear reactor fuel assembly is enhanced by increasing the crush strength of the zircaloy spacer grids which locate and support the fuel elements in the fuel assembly. Increased resistance to deformation as a result of laterally directed forces is achieved by increasing the section modulus of the perimeter strip through bending the upper and lower edges thereof inwardly. The perimeter strip is further rigidized by forming, in the central portion thereof, dimples which extend inwardly with respect to the fuel assembly. The integrity of the spacer grid may also be enhanced by providing back-up arches for some or all of the integral fuel element locating springs and the strength of the fuel assembly may be further enhanced by providing, intermediate its ends, a steel seismic grid.

13 Claims, 6 Drawing Figures

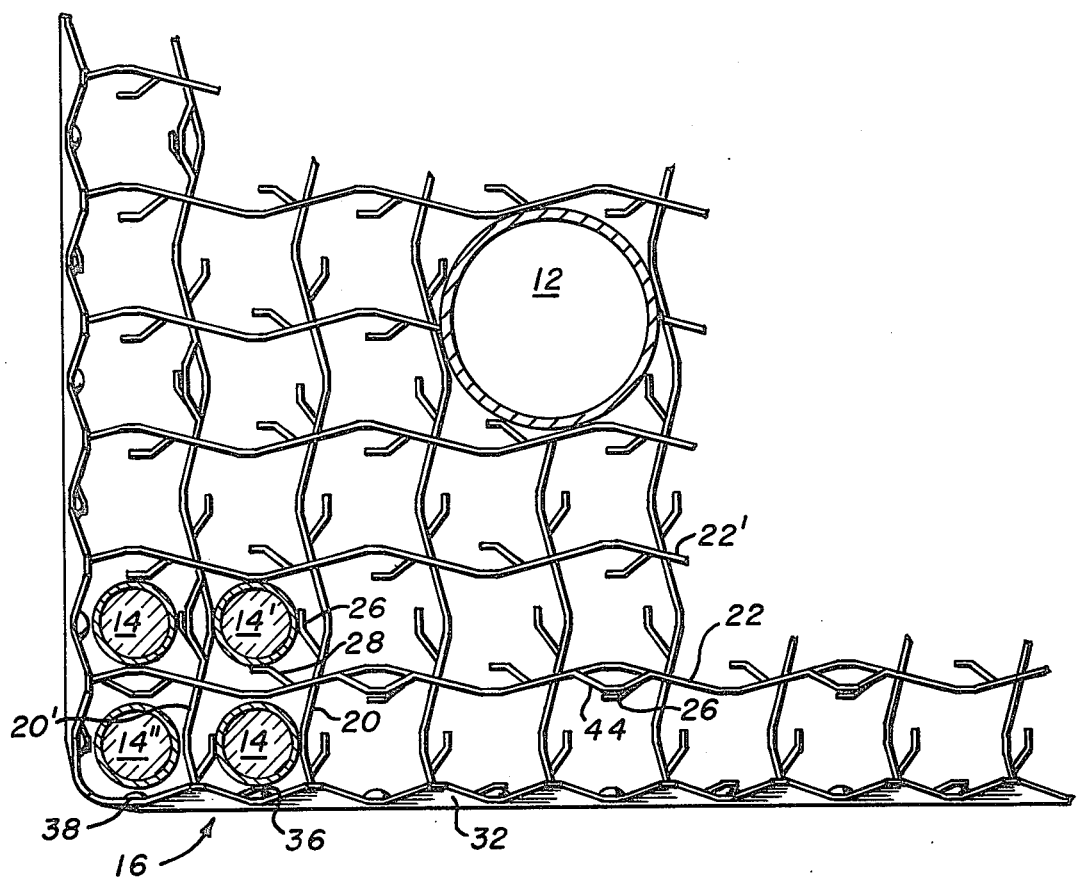
FIG. 2
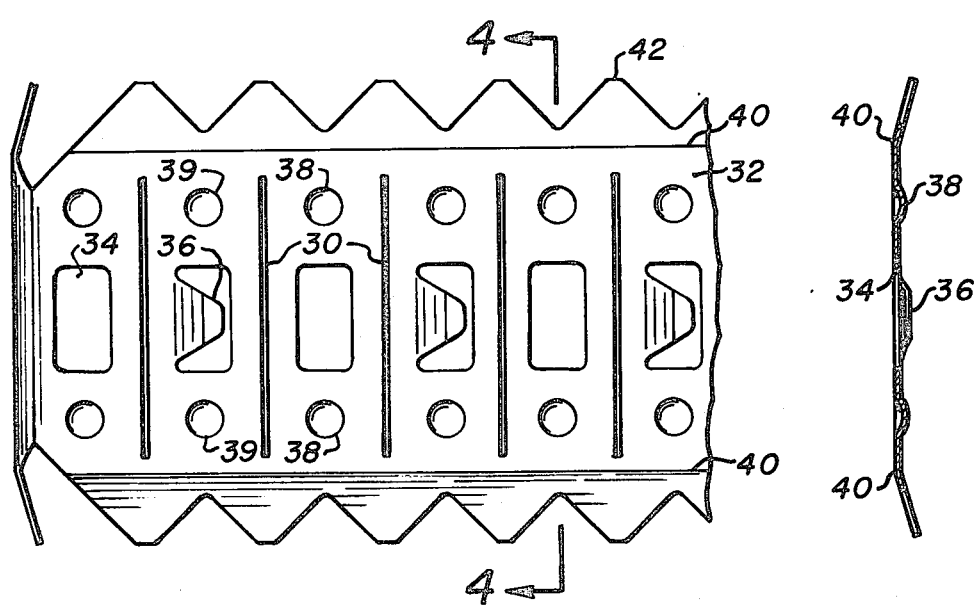
FIG. 3
FIG. 4

NUCLEAR REACTOR SEISMIC FUEL ASSEMBLY GRID

BACKGROUND OF THE INVENTION

1. Field of the Invention

The present invention relates to the supporting of fuel elements within a nuclear reactor and particularly to enhancing the ability of fuel assemblies to withstand seismic loading. More specifically, the present invention relates to high strength nuclear reactor fuel assemblies and to spacer and seismic grids for use therein. Accordingly, the general objects of the present invention are to provide novel and improved methods and apparatus of such character.

2. Description of the Prior Art

The functions performed by and the considerations which enter into the design of spacer grids for nuclear reactor fuel assemblies are discussed in detail in U.S. Pat. Nos. 3,607,640 and 3,664,924 issued to Donald M. Krawiec and assigned to the assignee of the present invention. These two patents are incorporated into the present disclosure by reference and may be considered to exemplify the state of the art at the time the invention disclosed herein was conceived.

Fuel assemblies employing the spacer grids of the prior art, for example those of the above-referenced patents, perform admirably under most conditions. The previous spacer grids have usually been fabricated substantially entirely of a zirconium alloy; i.e., zircaloy. The use of annealed zircaloy has been directed by its desirable combination of mechanical strength, workability and low neutron capture cross-section and the number of spacer grids employed in a single fuel assembly will be minimized, to an extent commensurate with structural requirements, in the interest of enhancing reactor operating efficiency. While possessing adequate resistance to buckling under normal operating conditions, laboratory tests have shown that prior art zircaloy spacer grids do not have the mechanical strength required to absorb severe lateral stresses as might be encountered as a result of high seismic loading. While the strength of reactor fuel assembly spacer grids could be increased by the use therein of metals having a greater stiffness than annealed zircaloy, most of such higher strength materials are also characterized by higher neutron capture cross-section when compared to zircaloy and a principal objective in the design of a fuel assembly for a nuclear reactor is to maximize operating efficiency by minimizing neutron capture.

There has previously been reluctance to install nuclear reactors in geographic regions having a history of seismic events of substantial magnitude. This reluctance is, in part, based upon the possible damage to the reactor which might occur as a result of high seismic loading. The type of damage which could conceivably result would be permanent distortion of the zircaloy fuel assembly spacer grids and thus of the fuel assemblies themselves. Any such permanent fuel assembly distortion could preclude or render difficult the removal of fuel assemblies as required during a refueling operation. Laboratory tests have shown that the probable effects of extremely high seismic loading on a fuel assembly would be bending of the guide tubes for the reactor control rods and roll-over of an outer row of the fuel assembly; the outer row being in part defined by a spacer grid perimeter strip which anchors the spring members which cooperate with the perimeter strip to form the egg-crate type grid. Additional probable effects of high seismic loading include fuel rod support failure and a shifting of the pattern of fuel rods with the fuel assembly to a pattern unfavorable to proper cooling. These deleterious effects would result from fuel assembly to fuel assembly impact under high seismic loading. The possibility of such impact results from the necessity of leaving spacing between the individual fuel assemblies which comprise the reactor core in the interest of facilitating loading and refueling and also to allow for irradiation induced growth of the zircaloy components of the fuel assemblies.

To briefly summarize, the fuel assemblies of the prior art have not been suitable for employment in a nuclear reactor intended for use in a location where severe earthquakes are probable because of the possibility of fuel assembly to fuel assembly impact and the lack of sufficient strength of the fuel assembly spacer grids to resist such impacts without undergoing permanent distortion. Previous proposals to enhance spacer grid strength have contemplated the use of materials having greater stiffness and higher neutron capture cross-section when compared to zircaloy. The use of such stiffer materials would impose a significant penalty on reactor operating costs and thus has been an unacceptable alternative to a user such as an electrical utility.

SUMMARY OF THE INVENTION

The present invention overcomes the above briefly discussed deficiencies and disadvantages of the prior art by enhancing the strength of nuclear reactor fuel assemblies. Fuel assemblies employing the present invention, however, do not have a measurable deleterious effect on reactor operating cost and efficiency when compared to the prior art.

In accordance with the invention, the crush strength of a zircaloy reactor fuel assembly spacer grid is increased by greater than 100%. This increase is principally attributable to a novel and improved perimeter strip. This novel perimeter strip is characterized by increased height when compared to the prior art and inwardly angled upper and lower edges which define, along the bend lines, rigidizing beams. The fuel assembly spacer grid perimeter strips of the present invention are further characterized by "dimples" which extend inwardly into some or all of the fuel rod receiving grid sectors; the dimples also serving to rigidize the perimeter strip and functioning as either stops for fuel rods urged toward the perimeter strip by springs on the oppositely disposed grid internal spring member or serving as back-up arches for integral fuel rod positioning springs which extend inwardly from the perimeter strip. The junction of the internal grid defining spring members and the perimeter strip, in accordance with the present invention, is characterized by a weld seam of substantially greater length than has previously been employed; such increased weld seam also enhancing the strength of the fuel assembly.

A reactor fuel assembly spacer grid in accordance with the invention may also be provided with back-up arches positioned "behind" each or some of the fuel rod positioning springs formed on the internal grid defining spring members. The back-up arches, when employed, are integral with the spacer grid internal spring members and will restrict the compression of the springs thus preventing the exceeding of the elastic limits of the springs in response to high seismic loading. If the elastic limits of the fuel rod positioning springs were exceeded, the springs would acquire a permanent set and the fuel rods would thereafter be loosely retained. There may be a pair of back-up arches associated with each internal spring. In accordance with a preferred embodiment, these pairs of back-up arches, which normally do not contact the fuel rods, will be provided only in the other row of the fuel assemblies; i.e., the back-up arches will be formed integrally only in the internal spacer grid spring members which are immediately adjacent to and extend parallel to the perimeter strip.

The perimeter strips of a reactor fuel assembly spacer grid in accordance with the present invention are also characterized by serrated upper and lower edges. The serrations are formed wholly in the aforementioned inwardly angled perimeter strip edges and define, between the teeth of the serrations, lead-in and lead-out cuts; the teeth of the serrations forming anti-hand-up tabs which prevent binding or hanging up of adjacent fuel assemblies on one another during initial loading or refueling. The lead-in and lead-out cuts are in registration with the dimples and integral springs on the perimeter strip and the dimples and springs extend inwardly a greater distance than the bent-over edge portions of the perimeter strip in the cut-defining valleys of the serrated edges.

The possibility of reactor fuel assembly damage as a result of high seismic loading may be further substantially reduced through the use of at least one seismic grid which is added to the fuel assembly intermediate its ends. The seismic grid, which is preferably comprised of stainless steel, does not replace one of the standard zircaloy spacer grids and normally does not support or otherwise contact the fuel rods. The sole purpose of the seismic grid is to reduce the possible lateral deflection of the individual fuel rods and the entire fuel rod assembly. The reduction in possible deflection, in turn, reduces the possibility of impact of the spacer grids of one fuel assembly on an adjacent fuel assembly, reduces the magnitude of forces associated with any such impact, reduces the possibility of bending of the guide tubes which extend through the fuel assembly and also minimizes the possibility of impact damage to individual fuel rods.

As noted, the seismic grid is preferably comprised of stainless steel. Stainless steel is selected because of its favorable thermal and irradiation induced expansion characteristics. The seismic grid may either be continuous about the periphery of the fuel assembly or, in the interest of minimizing the effects of the material comprising the seismic grid on the operating efficiency through neutron capture, the seismic grid may extend along only a portion of each side of the fuel assembly; such portion extending in opposite directions from the mid point of each side. The seismic grid is associated with the fuel assembly by being rigidly mounted on the guide tubes.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several figures and in which:

FIG. 2 is a partial top plan view of an improved spacer grid for the fuel assembly of FIG. 1;

FIG. 3 is a partial side elevation view of the spacer grid of FIG. 2;

FIG. 4 is a cross-sectional side elevation view of the perimeter strip of the spacer grid of FIGS. 2 and 3 taken along line 3—3 of FIG. 2;

DESCRIPTION OF THE PREFERRED EMBODIMENT

Figure 1:
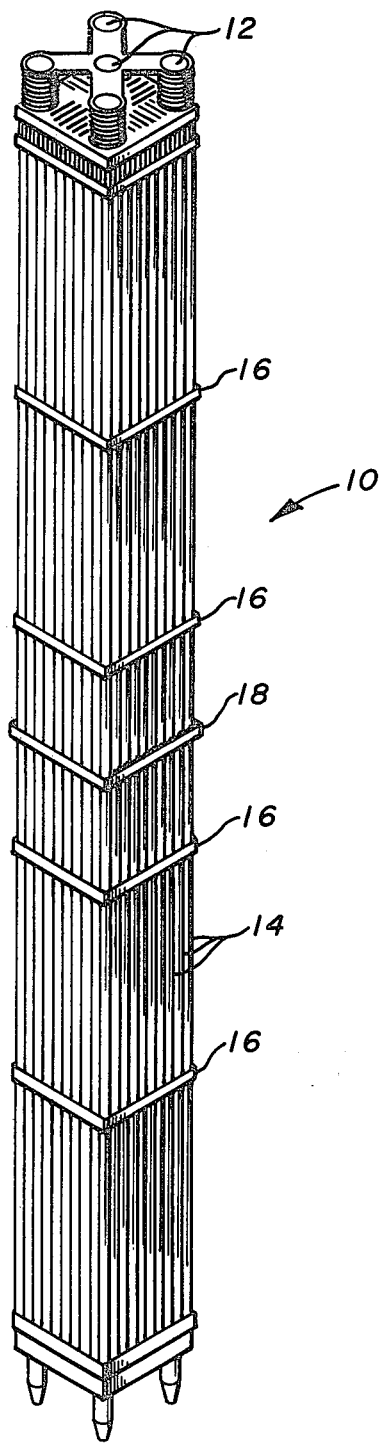
FIG. 1 is a perspective view of a nuclear reactor fuel assembly incorporating the present invention.

With reference to FIG. 1, a fuel assembly incorporating improved spacer grids and a seismic grid is illustrated generally at 10. Fuel assembly 10 includes, extending longitudinally therethrough, five guide tubes 12. Control rods, in the form of neutron absorber elements, move within guide tubes 12 and extensions thereof which are not shown in the drawing; such control rods serving as a means for regulating the thermal output power of the reactor. The fuel assembly also includes a plurality of fuel rods 14. In a typical 16 × 16 array, there will be 236 fuel rods in each fuel assembly and the reactor core may receive as many as 18 of the fuel assemblies 10. Each fuel rod 14 comprises a hermetically sealed elongated tube, known in the art as the cladding, which contains a fissionable fuel material such as uranium in the form of pellets. As may best be seen from FIG. 2, the individual fuel rods 14 are supported in the fuel assembly, by means of a plurality of spacer grids 16, such that an upwardly flowing liquid coolant may pass over the fuel rods thus preventing overheating and possible melting through of the cladding. In the manner well known in the art, the coolant, after passing through the reactor core and being heated through contact with the fuel rods, will be delivered to a heat exchanger and the heat extracted from the circulating coolant will be employed to generate steam for driving a turbine.

As noted, and as may be seen from joint consideration of FIGS. 1 and 2, the positioning and retention of the fuel rods in fuel assembly 10 is accomplished through use of a plurality of spacer grids 16. All or several of spacer grids 16 may be of the improved design depicted in FIGS. 2–4. If the operating environment so warrants, fuel assembly 10 may also be provided with one or more seismic grids 18. If a single seismic grid 18 is employed it will be located as shown intermediate the ends of the fuel assembly. It may, in some circumstances, be desirable to employ a pair of additional seismic grids 18 positioned equidistant between the seismic grid of FIG. 1 and the opposite ends of the fuel assembly. The seismic grids, when employed, will preferably be comprised of stainless steel and will be of the type depicted in FIGS. 5 and 6.

As briefly noted above, and as will be understood by those skilled in the art, the reactor core will comprise a plurality of fuel assemblies 10 supported in a core shroud mounted within a core support barrel; the core shroud typically being comprised of stainless steel. There will be gaps between the adjacent fuel assemblies 10, as positioned within the core shroud, and also between the outermost fuel assemblies and the wall of the shroud. These gaps, which allow a limited degree of relative movement between adjacent fuel assemblies, are necessary to permit the withdrawal and insertion of fuel assemblies, as incident to a refueling operation, and to permit the irradiation induced growth of the zircaloy components of the fuel assemblies. Thus, by way of example, in the assembly of a reactor core a cold spacing of 0.074 inches, corresponding to a hot spacing of 0.1 inches, will be left between adjacent fuel assemblies to permit relative vertical movement therebetween during refueling. It is to be noted that, due to differential expansions which will not be described herein, when the reactor is running hot the spacing between the fuel assemblies will be larger than under cold conditions. The aforementioned spacing includes the clearance left between fuel assemblies to accommodate thermal and irradiation induced growth. Under a seismic load the fuel assemblies could, with this spacing, move about and impact against each other and against the walls of the core shroud. Such impacts could, if sufficiently strong, cause the permanent distortion of the fuel assembly spacer grids of the prior art, could also cause bending of the guide tubes and could result in damage to the cladding of individual fuel assemblies through varying the coolant flow characteristics of the fuel assembly or otherwise. Additionally, high seismic loading could also cause the exceeding of the elastic limit of the integral grid assembly springs of the prior art fuel assemblies; this particularly being true for those springs in the outer rows of the fuel assemblies.

With reference now jointly to FIGS. 2-4, a zircaloy spacer grid of increased strength is indicated generally at 16. In the manner known in the art, the spacer grid 16 supports and aligns the fuel rods 14 through the establishment of six points of contact therewith. Thus, in conventional practice as depicted in FIG. 2, each of fuel rods 14 is contacted by a pair of generally transversely oriented springs which respectively urge the fuel rod against oppositely disposed stop members in each sector of the grid. The stop members will customarily be provided in pairs with the individual stops of each pair being respectively vertically above and below a plane through the point of contact of the springs with the fuel rod cladding. Thus, considering fuel rod 14', this element is urged by means of springs 26 and 28, respectively integral with spacer grid internal spring members 20 and 22, against pairs of arches formed respectively on sparing members 20' and 22'.

The spacer grid 16 is assembled by interleaving of the internal spring members 20 and 22 and the ends of members 20 and 22 may be engaged in slots 30 provided in the spacer grid perimeter strip 32. Welds are formed at all points of intersection within the spacer grid and the ends of the spring members 20 and 22 are either welded into the slots 30 in perimeter strip 32 or are butt welded to the perimeter strip. When compared to the prior art, the spacer grid of the present invention has a longer spring member to perimeter strip weld line and thus greater resistance to deformation.

Referring to FIG. 3, perimeter strip 32 is provided with cut-outs or "windows" 34 in regions corresponding to alternate sectors of the outer row of the spacer grid. These "windows," which are of smaller dimensions when compared to the windows of prior art perimeter strips such as shown in referenced U.S. Pat. No. 3,607,640, enhance coolant flow while simultaneously minimizing the neutron capture of the spacer grid. The perimeter strip 32 is also stamped so as to form, in sectors which alternate with the sectors provided with "windows" 34, inwardly extending integral springs 36. As may be seen from FIG. 2 by reference to fuel rod 14, each of springs 36 cooperates with an internal spring on a grid defining spring member to support and align a fuel rod of the outer row of the fuel assembly.

The perimeter strip 32 is also provided, above and below each of the windows 34, with inwardly extending dimples 38. Dimples 38, in the manner known in the art, enhance the rigidity of perimeter strip 32. Restated, the presence of dimples 38 increases the resistance of strip 32 to bending in response to a force component directed along the length of the perimeter strip. Additionally, as may be seen in the case of fuel rod 14''', dimples 38 function as stops or arches against which the fuel rod will be urged by the internal spring integral with the spring member 20. The dimples 38 must be provided above and below each of perimeter strip "windows" 34. Additional pairs of dimples 39 may also be provided in the perimeter strip sectors which have the integral springs 36 formed therein. In the interest of facilitating understanding of the drawing, the dimples 39 have not been shown in FIG. 2. When employed, dimples 39 will not extend into the fuel assembly sector as far as the fuel rod contacting springs 36 and the dimples 39 will thus function as back-up arches to prevent the elastic limit of springs 36 from being exceeded should the fuel assembly be subjected to vibration in excess of that encountered during normal operation as a result of coolant flow. The pairs of dimples 39, if provided, will also enhance the rigidity of perimeter strip 32.

The perimeter strips 32 of the improved spacer grid of FIGS. 2-4 are also provided, as may best be seen from a joint consideration of FIGS. 3 and 4, with inwardly extending upper and lower edge portions; the inwardly extending edge portions flaring inwardly from bend lines 40. The presence of the bent over edge portions of perimeter strip 32, which for the purposes to be described below are serrated, increases the section modulus of the perimeter strip and results in the perimeter strip functioning as a beam characterized by increased resistance to bending in response to a longitudinal force component when compared to a flat perimeter strip or a strip provided with a plurality of irregularities. The serrations; i.e., the valleys between the teeth 42; start outwardly with respect to bend lines 40. The valleys of the serrated upper and lower edges of perimeter strip 32 function as lead-in and lead-out cuts or slots which facilitate insertion of the fuel rods 14; the bases of the slots or cuts being aligned with the center of the windows 34 and springs 36 in the perimeter strip 32. The teeth 42 of the serrated upper and lower perimeter strip edges function as anti-hand-up tabs; these tabs or teeth 42 preventing the hanging or interference between adjacent fuel assemblies during refueling.

Although not absolutely essential for operation, it may be desirable to include, in spacer grid 16, back-up arches 44 formed in the spring member 20 and 22. The back-up arches 44, which will be provided in pairs, are shown in FIG. 2 as being provided only in the outer rows of fuel rod receiving grid sectors. Thus, in FIG. 2, the back-up arches are formed in spring members 20' and 22. It will be understood that pairs of back-up arches can be provided for each internal spacer grid spring. The back-up arches extend into the spacer grid sectors above and below the springs 26 in the same direction as but for a shorter distance than springs 26. As described above in the discussion of dimples 38 in the perimeter strip 32, the back-up arches 44 prevent compression of the internal springs to a point where the elastic limit thereof would be exceeded.

To summarize the significant features of the spacer grid of FIGS. 2-4, the perimeter strip 32 is, when compared to the prior art, wider and contains stiffening dimples. The perimeter strip 32 of the spacer grid is also characterized by inwardly angled upper and lower edge portions which also add to the stiffness of the strip. The connection between the perimeter strip and the internal spring members is defined by a weld seam of increased length when compared to prior art spacer grids and the serrated upper and lower edges of the perimeter strip define anti-hang-up tabs and lead-in and lead-out cuts. Also, pairs of back-up arches may be associated with some or all of the internal springs of the spacer grid to prevent the elastic limit of the internal springs from being exceeded. Tests have shown that the spacer grid of FIGS. 2-4 exhibits an improvement in impact strength by a factor in excess of 2 and this increase in impact strength has been achieved with essentially no perturbation in enrichment or added resistance to coolant flow; i.e., no increase in pressure drop across the fuel assembly; and with little change in the cost of fabrication of the grid.

Figure 5:
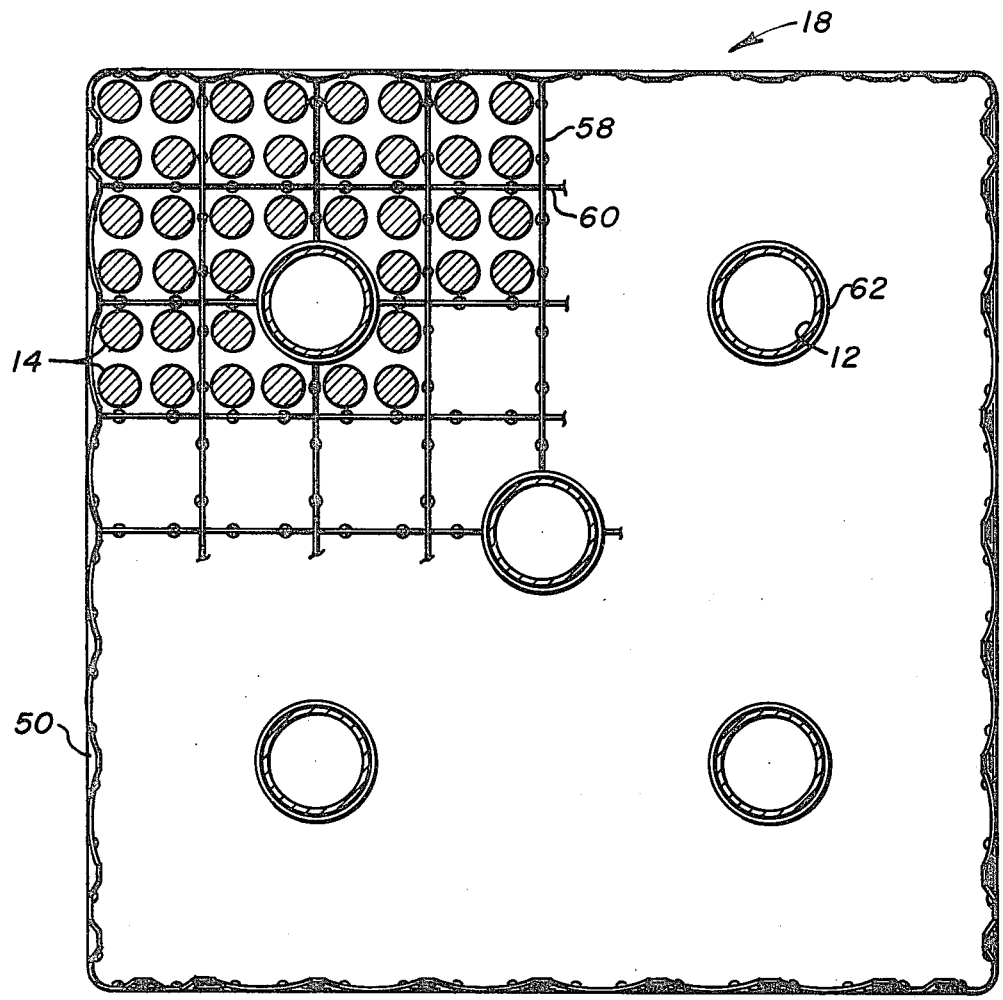
FIG. 5 is a partial top plan view of a seismic grid for the fuel assembly of FIG. 1.
Figure 6:
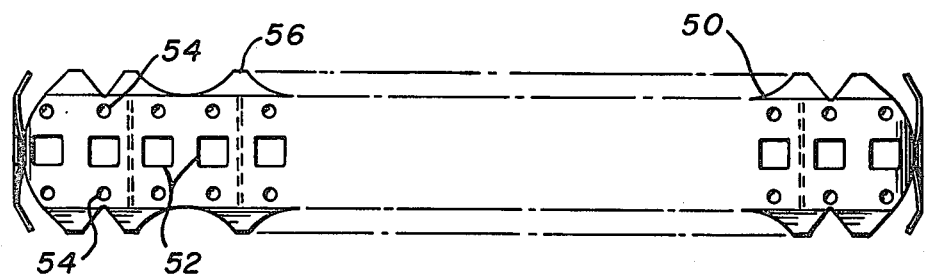
FIG. 6 is a side elevation view of the seismic grid of FIG. 5.

Referring now to FIGS. 5 and 6, the seismic grid 18 is preferably comprised of stainless steel and is designed for optimum strength with minimum material. Stainless steel is a highly parasitic material which has a strong influence on fuel enrichment and, accordingly, the amount of steel present in seismic grid 18 is limited to an amount commensurate with the requisite grid strength. Seismic grid 18 will be employed in fuel assembly 10 only in cases where extreme seismic loading would be a possibility. it is also to be noted that, while FIG. 1 depicts a single seismic grid 18 located at the mid point of the length of the fuel assembly, it may in some cases be necessary to employ two additional seismic grids positioned intermediate centrally located grid 18 and the opposite ends of the fuel assembly.

The seismic grid 18 reduces lateral deflection of fuel assembly 10 by means of reducing the clearance or gap between adjacent fuel assemblies. Seismic grid 18 thus extends outwardly from the sides of the fuel assembly a slight distance further than the most outwardly disposed portions of the spacer grids 16. This outward extension of seismic grid 18 is shown greatly exaggerated in FIG. 1. Reducing the gap between adjacent fuel assemblies lowers the impact and bending forces which may be generated as a result of seismic loading since the movements of the fuel assembly will be limited by contact between adjacent seismic grids. Through the use of stainless steel, or another metal having equivalent characteristics, the gap between fuel assemblies may be made significantly less than that which must be left between the zircaloy spacer grids, at the beginning of reactor life, because only minimal allowance must be made for irradiation induced growth of the stainless steel. Also, the size of the gap between the seismic grids on adjacent fuel assemblies will not increase at temperature because of differential expansion between the seismic grids and the upper and lower end plates of the fuel assembly; these upper and lower plates typically being comprised of Inconel. Conversely, the gap between the zircaloy spacer grids will increase with temperature.

Thus, to summarize, the possibility of severe impact of the fuel assemblies upon each other and upon the wall of the core shroud is eliminated by reducing the spacing between fuel assemblies and between the outer fuel assemblies and the shroud. This reduction in clearance between fuel assemblies, which limits the lateral displacement of the fuel assemblies when subjected to severe vibratory loading such as would accompany a seismic event, is permitted by the use of one or more stainless steel seismic grids. The seismic grid or grids, as may be clearly seen from FIG. 5, do not replace a standard zircaloy spacer grid and do not support the fuel rods. Thus, seismic grid 18 will serve only as an amplitude limiting device in reducing the possible lateral deflection of the fuel assemblies to thereby reduce spacer grid impact and the possible bending of the fuel assembly guide tubes.

Referring jointly to FIGS. 5 and 6, seismic grid 18 includes a perimeter strip 50. Perimeter strip 50 need not be continuous around the entire periphery of the seismic grid. Thus, in the interest of reducing the amount of stainless steel employed, perimeter strip 50 may only extend along portions of each side of the seismic grid; such portions extending from the mid point of each side toward the corners of the grid. Also in the interest of reducing the amount of steel, and additionally in the interest of enhancing coolant flow and imposing minimum resistance to such flow, the perimeter strip 50 is provided with "windows" 52 which are preferably in registration with each of the fuel rods 14 in the outer rows of the fuel assembly. The resistance of the perimeter strips to distortion when subjected to a longitudinal force component is enhanced by the formation of dimples 54 above and below each of the windows 52 in perimeter strip 50. Dimples 54, which permit the reduction of the width of strip 50, also serve to limit the motion of the individual fuel rods 14 and thus are equivalent to the dimples 38 of the spacer grid of FIG. 3. As noted above, dimples 54 are normally not in contact with the fuel rods 14. If deemed necessary or desirable, seismic grid perimeter strip 50 may be further rigidized, or the same rigidity realized with a reduction in size, by bending over the edges of strip 50 in the same manner as above-described spacer grid perimeter strip 32.

The seismic grid perimeter strip 50 is also provided with serrated upper and lower edges with the teeth of the serrations being bent inwardly to define anti-hang-up tabs. Preferably, as shown in FIG. 6, with the exception of the corner regions of the grid, the serration in the edges of the seismic grid perimeter strip 50 provides anti-hang-up tabs only in the regions where a seismic grid internal member is joined to the perimeter strip. Since the seismic grid, as clearly seen from FIG. 5, employs fewer internal members than the spacer grid of FIGS. 2-4, the valleys between the serrations in the edges of perimeter strip 50 may be of larger dimension thus further reducing the amount of steel employed.

It is to be noted that, should the perimeter strip 50 extend around the corners of the fuel assembly as shown in FIGS. 5 and 6, the frequency of anti-hang-up tabs will be increased in the perimeter strip in the corner segments of the seismic grid.

As noted above, the internal members of seismic grid 18 define a grid structure having larger sectors when compared to the spacer grid wherein a sector is provided for each fuel rod. As shown in FIG. 5, four fuel rods pass through each sector of seismic grid 18. The internal grid defining members, such as members 58 and 60, are welded to each other at their points of intersection and are also joined to perimeter strip 50 by means of a butt weld. Internal grid members 58 and 60 are, like the perimeter strip 50, provided with pairs of dimples, the dimples of each pair being vertically displaced, which limit the motion of fuel rods 14 but which normally do not contact the fuel rods.

The seismic grid 18 is mounted on the fuel assembly by a means of being attached to the guide tubes 12. The mounting of the seismic grid is accomplished by providing, in the grid, tube segments 62 which may be comprised of either zircaloy or stainless steel. When comprised of zircaloy, the tube segments 62 will be inserted in the grid and expanded so as to be locked in place. When comprised of steel, the tube segments 62 will be welded to the grid internal members. The tube segments 62 will slide over the guide tubes and will be joined to the exterior thereof by any suitable method. Since the guide tubes will usually be comprised of zircaloy, if tube segments 62 are steel the guide tubes will be expanded so as to be locked to the tube segments 62.

While a preferred embodiment has been shown and described various modifications and substitutions may be made thereto without departing from the spirit and scope of the invention. Accordingly, it is to be understood that the present invention has been described by way of illustration and not limitation.

What is claimed is:

1. A fuel assembly for a nuclear reactor comprising:
    at least a first grid for supporting a plurality of elongated fuel elements in a spaced apart substantially parallel relationship, said spacer grid including:
        a perimeter strip which defines the periphery of the spacer grid, said parameter strip having a central portion and pair of oppositely disposed integral edge portions, said central portion and edge portions extending along the length of the perimeter strip and completely about the spacer grid, said perimeter strip edge portions being bent inwardly with respect to said control portion at an angle of less than 90° C, said inwardly angled perimeter strip edge portions being terminated so as to provide a clearance between said perimeter strip edge portions and fuel elements received in said spacer grid, said perimeter strip central portion being provided with a plurality of openings therein, said openings being aligned with the fuel elements received in said spacer grid, said perimeter strip central portion further being provided with inwardly extended projections respectively located above and below each of said openings; and
        a plurality of divider members positioned within said perimeter strip, said divider members intersecting said perimeter strip intermediate the openings therein and being mechanically joined to said perimeter strip, said divider members being arranged in a crossing pattern to define a grid which receives a fuel element in each grid sector, the outer row of sectors of said grid being in part defined by said perimeter strip, said divider members including:
            fuel element locating springs, said springs being positioned so as to extend into the sectors of said grid, one of said locating springs extending from a divider member oriented generally parallelly to said perimeter strip into every second one of the grid sectors of the outer row and toward said perimeter strip; and
            back-up arches formed on at least the divider members which are adjacent to and generally parallel with said perimeter strip, said back-up arches being adjacent to the springs which extend into every second grid sector of the outer row, said back-up arches extending toward said perimeter strip a lesser distance when compared to said locating springs whereby said back-up arches limit the compression of said locating springs by limiting the motion of the fuel elements.

2. The fuel assembly of claim 1 wherein said perimeter strip edge portions each radiate inwardly at a constant angle and wherein said edge portions are serrated with the teeth of said serrations being disposed wholly outwardly with respect to the junction of said central and edge portions.

3. The fuel assembly of claim 1 wherein said spacer grid perimeter strip projections comprise inwardly extending dimples formed in the central portion of said perimeter strip.

4. The fuel assembly of claim 2 wherein said spacer grid perimeter strip projections comprise inwardly extending dimples formed in the central portion of said perimeter strip.

5. The fuel assembly of claim 1 wherein said perimeter strip further comprises:
    fuel element positioning springs extending into alternate of the grid sectors of the outer row of said spacer grid, said positioning springs being in alignment with openings in said perimeter strip, said positioning springs extending into those grid sectors of the outer row which do not have fuel element locating springs extending thereinto toward said perimeter strip from a parallelly oriented divider member.

6. The fuel assembly of claim 5 wherein said spacer grid perimeter strip projections comprise inwardly extending dimples formed in said perimeter strip central portion above and below each of said openings.

7. The fuel assembly of claim 6 wherein said perimeter strip edge portions each radiate inwardly at a constant angle and wherein said edge portions are serrated with the teeth of said serrations being disposed wholly outwardly with respect to the junction of said central and edge portions.

8. The fuel assembly of claim 7 wherein said perimeter strip serrated edge portions are formed so as to place the valleys between serrations in substantial alignment with said openings and positioning springs.

9. The fuel assembly of claim 8 wherein the spacer grid perimeter strip dimples which project into the grid sectors of the outer row into which the positioning springs extend from said perimeter strip have a maximum length which is less than the extension of said springs whereby said dimples function to prevent the elastic limit of said springs from being exceeded.

10. The fuel assembly of claim 1 further comprising:
    a plurality of guide tubes, said guide tubes being oriented substantially parallelly to said fuel elements; and
    at least a first seismic grid supported on said guide tubes, said seismic grid having a perimeter strip and a plurality of divider members, said seismic grid having exterior dimensions in excess of the dimensions of said spacer grid.

11. The fuel assembly of claim 10 wherein said spacer grid is comprised of zircaloy and said seismic grid is comprised of steel.

12. The fuel assembly of claim 9 further comprising:
    a plurality of guide tubes, said guide tubes being oriented substantially parallelly to said fuel elements; and at least a first seismic grid supported on said guide tubes, said seismic grid having a perimeter strip and a plurality of divider members, said seismic grid having exterior dimensions in excess of the dimensions of said spacer grid.

13. The fuel assembly of claim 12 wherein said spacer grid is comprised of zircaloy and said seismic grid is comprised of steel.

* * * * *